(12) United States Patent
Araki et al.

(10) Patent No.: US 7,852,072 B2
(45) Date of Patent: Dec. 14, 2010

(54) TEST-DEVICE SYSTEM FOR INDEPENDENT CHARACTERIZATION OF SENSOR-WIDTH AND SENSOR-STRIPE-HEIGHT DEFINITION PROCESSES

(75) Inventors: Satoru Araki, San Jose, CA (US);
Robert S. Beach, Los Gatos, CA (US);
Ying Hong, Morgan Hill, CA (US);
David J. Seagle, Morgan Hill, CA (US)

(73) Assignee: Hitachi Global Storage Technologies, Netherlands, B.V., Amsterdam (NL)

( * ) Notice: Subject to any disclaimer, the term of this patent is extended or adjusted under 35 U.S.C. 154(b) by 522 days.

(21) Appl. No.: 12/006,323

(22) Filed: Dec. 31, 2007

(65) Prior Publication Data

US 2009/0168217 A1    Jul. 2, 2009

(51) Int. Cl.
*G01R 33/12* (2006.01)
(52) U.S. Cl. .................................................. 324/210
(58) Field of Classification Search ........................ None
See application file for complete search history.

(56) References Cited

U.S. PATENT DOCUMENTS

| | | | |
|---|---|---|---|
| 6,642,713 B2 | 11/2003 | Diederich | |
| 6,731,110 B2 | 5/2004 | Church | |
| 2004/0257715 A1* | 12/2004 | Heim et al. | 360/324.1 |
| 2009/0166331 A1* | 7/2009 | Marley | 216/84 |

* cited by examiner

*Primary Examiner*—Jay M Patidar

(57) ABSTRACT

A test-device system and method for deconvoluting measurements of effects of a sensor-width definition process from measurements of effects of a sensor-stripe-height-definition process in a manufacture of a magnetic sensor. The test-device system comprises a first test device for generating data to characterize a sensor-width-definition process. The test-device system also comprises a second test device for generating data to characterize a sensor-stripe-height-definition process. The test-device system allows independent characterization of a sensor-width parameter and a sensor-stripe-height parameter.

20 Claims, 8 Drawing Sheets

TEST-DEVICE SYSTEM FOR INDEPENDENT CHARACTERIZATION OF SENSOR-WIDTH AND SENSOR-STRIPE-HEIGHT DEFINITION PROCESSES

TECHNICAL FIELD

Embodiments of the present invention relate generally to the field of magnetic sensor testing and characterization.

BACKGROUND

Magnetic sensors and in particular magnetic-recording sensors are complex devices fabricated by sensor-layer-structure deposition processes. The performance of magnetic sensors depends critically on the quality and properties of the sensor-layer-structure from which the sensors are fabricated. It is essential to be able to accurately characterize parameters related to these properties during the fabrication process.

In particular, properties related to the processes defining the sensor width and the sensor-stripe height are important for quality control of magnetic-recording sensors, because the amplitude and sensitivity of magnetic-recording sensors depend critically on processes defining the sensor width and the sensor-stripe height. The necessity of controlling these properties and their accurate characterization has been further increased by recent advances in the technology, such as tunneling magnetoresistance (TMR) sensor technology. Also, miniaturization of such devices to meet the demands of higher recording densities has created a greater need for accurately determining parameters that depend on processes defining the physical dimensions of these sensors.

SUMMARY

Embodiments of the present invention comprise a test-device system and method for deconvoluting measurements of effects of a sensor-width definition process from measurements of effects of a sensor-stripe-height-definition process in a manufacture of a magnetic sensor. The test-device system comprises a first test device for generating data to characterize a sensor-width-definition process. The test-device system also comprises a second test device for generating data to characterize a sensor-stripe-height-definition process. The test-device system allows independent characterization of a sensor-width parameter and a sensor-stripe-height parameter.

DESCRIPTION OF THE DRAWINGS

The accompanying drawings, which are incorporated in and form a part of this specification, illustrate embodiments of the invention and, together with the description, serve to explain the embodiments of the invention.

The drawings referred to in this description should not be understood as being drawn to scale except if specifically noted.

DESCRIPTION OF EMBODIMENTS

Reference will now be made in detail to the alternative embodiments of the present invention. While the invention will be described in conjunction with the alternative embodiments, it will be understood that they are not intended to limit the invention to these embodiments. On the contrary, the invention is intended to cover alternatives, modifications and equivalents, which may be included within the spirit and scope of the invention as defined by the appended Claims.

Furthermore, in the following description of embodiments of the present invention, numerous specific details are set forth in order to provide a thorough understanding of the present invention. However, it should be appreciated that embodiments of the present invention may be practiced without these specific details. In other instances, well known methods, procedures, and components have not been described in detail as not to unnecessarily obscure embodiments of the present invention.

Figure 1:
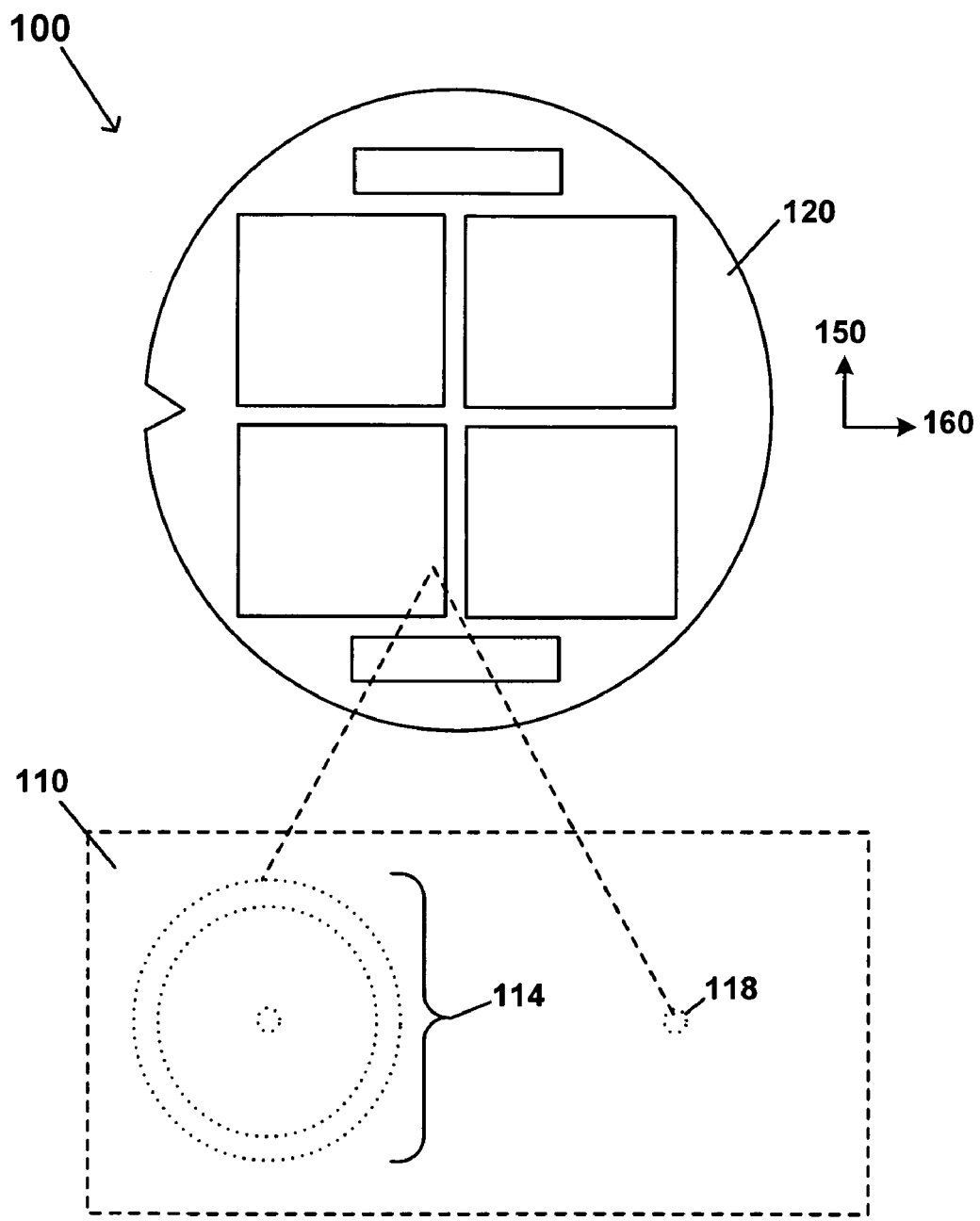
FIG. 1 is plan view illustrating the location of a test device system on a wafer and an expanded view of a portion of the wafer illustrating a physical configuration of test devices of the test device system in an embodiment of the present invention.

Physical Description of Embodiments of the Present Invention for a Test-Device System for Independent Characterization of Sensor-Width and Sensor-Stripe-Height Definition Processes With reference to FIG. 1, in accordance with an embodiment of the present invention 100, the location of a test-device system 110 on a wafer 120 used to fabricate magnetic heads, and the physical configuration of test devices 114 and 118 on the wafer 120 are shown. The magnetic heads comprise a read element, a magnetic sensor, and a write element, a magnetic flux generator, (not shown) and are arrayed in rows, shown as the space between parallel horizontal lines running across the wafer 120. In subsequent fabrication steps, the wafer 120 is parted along these lines into rows for a row-lapping process that defines a final "stripe height" (SH) of a magnetic-recording sensor before further dicing the rows up into individual heads.

As the performance of the magnetic head depends on the quality of the read and the write elements, it is useful to have test devices, known in the art as "test chips," integrated into the wafer 120 in proximity to the magnetic heads. Such "test chips" are provided for both the read and the write elements of a magnetic head, and are designed to test various performance related parameters of these elements. Of particular interest for embodiments of the present invention, are "test chips" that serve to characterize the performance of the read element, magnetic-recording sensor, of the magnetic head.

The stripe height is the lateral dimension of the side of the magnetic-recording sensor about perpendicular to the magnetic-recording disk surface, or the lateral dimension of the stripe along direction 150 as shown in FIG. 1, and the stripe width, sensor width, is the lateral dimension of the side of the magnetic-recording sensor perpendicular to the recording-track direction on magnetic-recording medium of a disk, or tape, or about parallel to the "track width" (TW) of written information and about the same dimension as the "track width", or the dimensions of the stripe along direction 160 as shown in FIG. 1.

Although the discussion so far has been framed from the point of view of magnetic-recording sensors, it should be recognized that embodiments of the present invention find application to magnetic sensors in general. For example, embodiments of the present invention apply to the metrology and measurement of sensor parameters of sensor structures in magnetoresistive random access memory (MRAMs) elements. Also, magnetic sensors generally may benefit from embodiments of the present invention. Although the impetus for embodiments of the present invention was TMR sensor technology, it was later recognized that embodiments of the present invention would also have utility for other magnetic sensor types, as well.

With further reference to FIG. 1, in accordance with the embodiment of the present invention 100, the test-device system 110 deconvolutes measurements of effects of a sensor-width definition process from measurements of effects of a sensor-stripe-height-definition process in a manufacture of a magnetic sensor. This deconvolution is especially useful for identifying the source of shunting resistance associated with "redep" during ion-milling processes that are typically employed for the sensor-width-definition process and the sensor-stripe-height-definition process. "Redep" is extraneous redeposited material thrown up on the sensor side-walls. The test-device system 110 comprises a first test device 114 for generating data to characterize a sensor-width-definition process, and a second test device 118 for generating data to characterize a sensor-stripe-height-definition process. The test-device system 110 allows the independent characterization of sensor-width parameters and sensor-stripe-height parameters through measurements made with the test devices 114 and 118, respectively.

Figure 2:
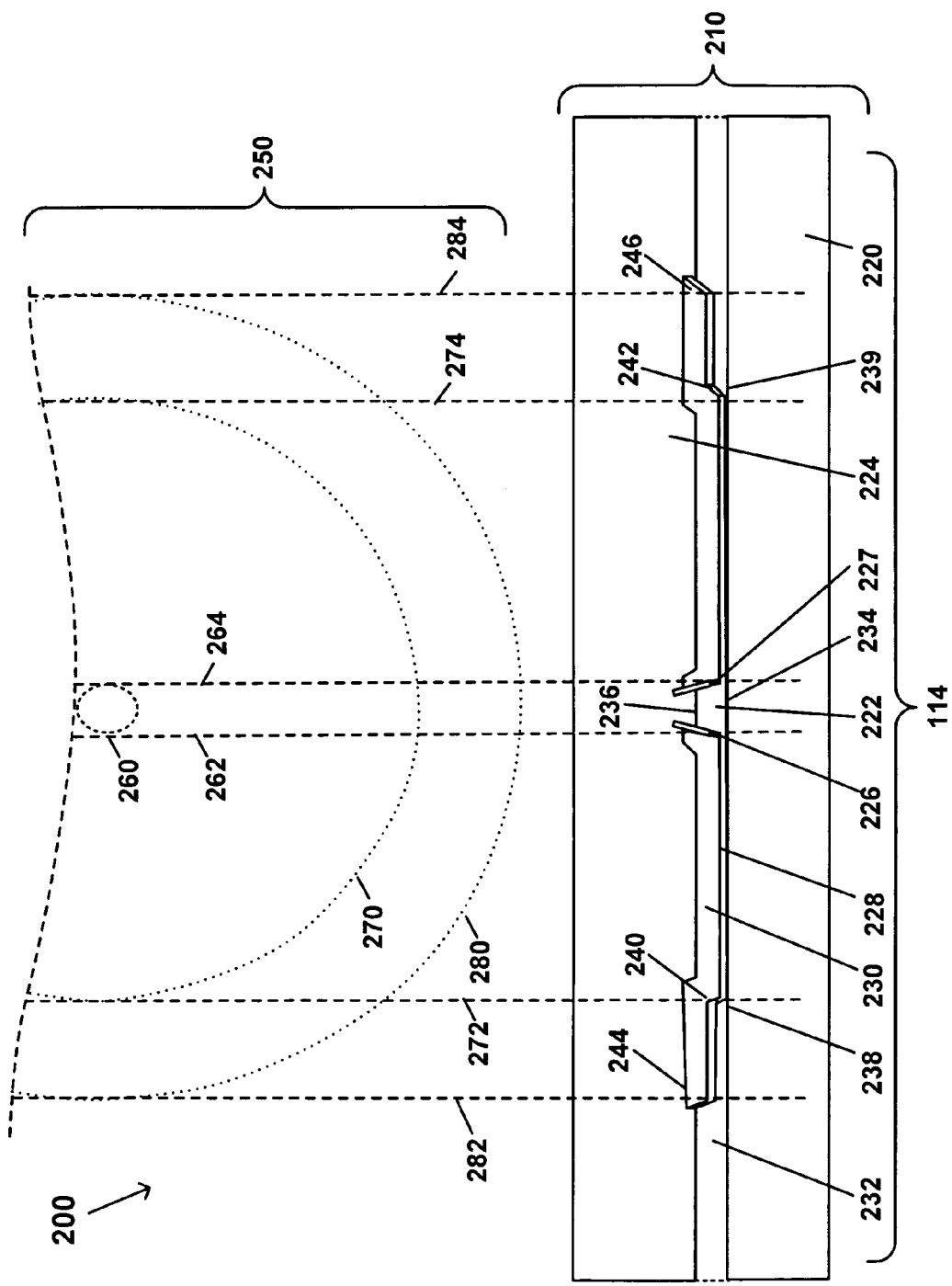
FIG. 2 is a combined cross-sectional and elevation view of a first test device for generating data to characterize a sensor-width-definition process in an embodiment of the present invention.

With reference to FIG. 2, in accordance with an embodiment of the present invention 200, the first test device 114 comprises a sensor-width-definition structure. A combined cross-sectional view 210 and elevation view 250 of the first test device 114 to characterize a sensor-width-definition process is shown. The sensor-width-definition structure of the first test device 114 comprises: a lower electrical contact layer 220, e.g. a first shield layer (S1 layer); a first sensor-layer-structure portion 222, e.g. a TMR sensor-layer-structure; and an upper electrical contact layer 224, e.g. a second shield layer (S2 layer); and an electrical insulation layer 228, e.g. a gap insulation layer. In addition, other layers may be present: a magnetic-bias-layer structure 230, e.g. a hard-bias (HB) magnet layer; and a field-region, electrical-isolation layer 232, e.g. a refill alumina layer.

With further reference to FIG. 2, in accordance with the embodiment of the present invention 200, the first test device 114 further comprises the first sensor-layer-structure portion 222 with a left edge 226 and a right edge 227; the left edge 226 and the right edge 227 are defined in one-cut with the sensor-width-definition process. It should be appreciated that edges extend all around the first sensor-layer-structure portion 222 in the plane of the wafer 120 coinciding approximately with the trace of a central circle 260 shown in the elevation view 250 of FIG. 2. By fabricating all the edges of the first sensor-layer-structure portion 222 with one-cut, e.g. with only the sensor-width, ion-milling process, the first test device 114 is fabricated that is suitable for measurement of effects of the sensor-width-definition process deconvoluted from measurements of effects of the sensor-stripe-height-definition process in the manufacture of the magnetic sensor. In particular, the effects of the sensor-width-definition process on sensor-width parameters can be characterized independently of the effects of the sensor-stripe-height-definition process on sensor-stripe-height parameters. This is significantly different from test-chips used in the past which used both a sensor-stripe-height-definition process and a sensor-width-definition process to define separate edges of the test chip, resulting in the convolution of effects from the two processes in measurements made on the test chip. Since the TMR sensor is so sensitive to redep on its side walls at the edges of the TMR sensor defined by these processes, it is important for control of the manufacturing process to be able to identify the exact source of shunting resistance, whether it may be the sensor-stripe-height-definition process or the sensor-width-definition process for TMR sensors.

With reference to FIG. 2, in accordance with the embodiment of the present invention 200, the first test device 114 is configured so that a test current can flow in from the first electrical contact layer 220 across a bottom contact surface 234 of the first sensor-layer-structure portion 222 up through the first sensor-layer-structure portion 222 and out across a top contact surface 236 of the first sensor-layer-structure portion 222 into the second electrical contact layer 224. In the alternative, the test current may flow in the opposite direction, in from the second electrical contact layer 224 across a top contact surface 236 down through the first sensor-layer-structure portion 222 and out across a bottom contact surface 234 into the first electrical contact layer 220. With such currents various parameters may be measured, the most useful parameter being a measurement of the resistance of the first sensor-layer-structure portion 222, when it is magnetically saturated with an applied magnetic field greater than 5 kOe directed parallel or antiparallel to the direction of 150 shown in FIG. 1. This resistance value can then be compared to the expected value based on full film parameters and size of the first sensor-layer-structure portion 222 of the test device 114 to check for deviations from expected behavior. It should be appreciated that issues similar to those discussed above apply to test device 118.

With reference again to FIG. 2, in accordance with the embodiment of the present invention 200, the first test device 114 is shown in the elevation view 250 when looking down on the wafer 120 from above as for the view shown in FIG. 1. The device is shown as three approximately concentric circles 260, 270 and 280; and, an active portion of the first test device 114 within the central circle 260 comprises a first disk of sensor-layer-structure material, shown in the cross-sectional view 210 in the lower part of FIG. 2. The concentric circles 260, 270 and 280 are actually the traces of steps and transitions between various layer structures corresponding to the position of various mask edges used in the sensor-stripe-height-definition process and the sensor-width-definition process. The correspondence between these steps and transitions in the various layer structures shown in cross-sectional view 210 and the circular traces of the elevation view 250 are indicated by vertical lines 262, 264, 272, 274, 282, and 284.

With further reference to FIG. 2, in accordance with the embodiment of the present invention 200, the circle 270 is shown by vertical lines 272 and 274 to correspond to a left edge 240 and a right edge 242 of steps produced by the mask used in the sensor-stripe-height-definition process, e.g. the stripe-height-ion-milling mask; as shown, these edges 240 and 242 correspond with the edges of the field-region, electrical-isolation layer 232 defined by the sensor-stripe-height-definition process. Similarly, the central circle 260 is shown by vertical lines 262 and 264 to correspond to the left edge 226 and the right edge 227 of side walls of the first sensor-layer-structure portion 222 produced by the mask used in the sensor-width-definition process, e.g. the sensor-width-ion-milling mask. It should be recognized that a thin remnant ring of sensor-layer-structure material, shown in cross-section as 238 and 239 may be present, which has no effect on the performance of the first test device 114.

With further reference to FIG. 2, in accordance with the embodiment of the present invention 200, the circle 280 is shown by vertical lines 282 and 284 to correspond to a left edge 244 and a right edge 246 of steps produced by the mask used in the sensor-width-definition process; as shown, these edges 244 and 246 correspond to steps in the field-region, electrical-isolation layer 232 defined by the sensor-width-definition process. In between these two circles 260 and 280, an annular aperture is defined in a photoresist layer through which sensor-layer-structure material may be removed by the sensor-width-definition process to define the first sensor-layer-structure portion 222.

Figure 3:
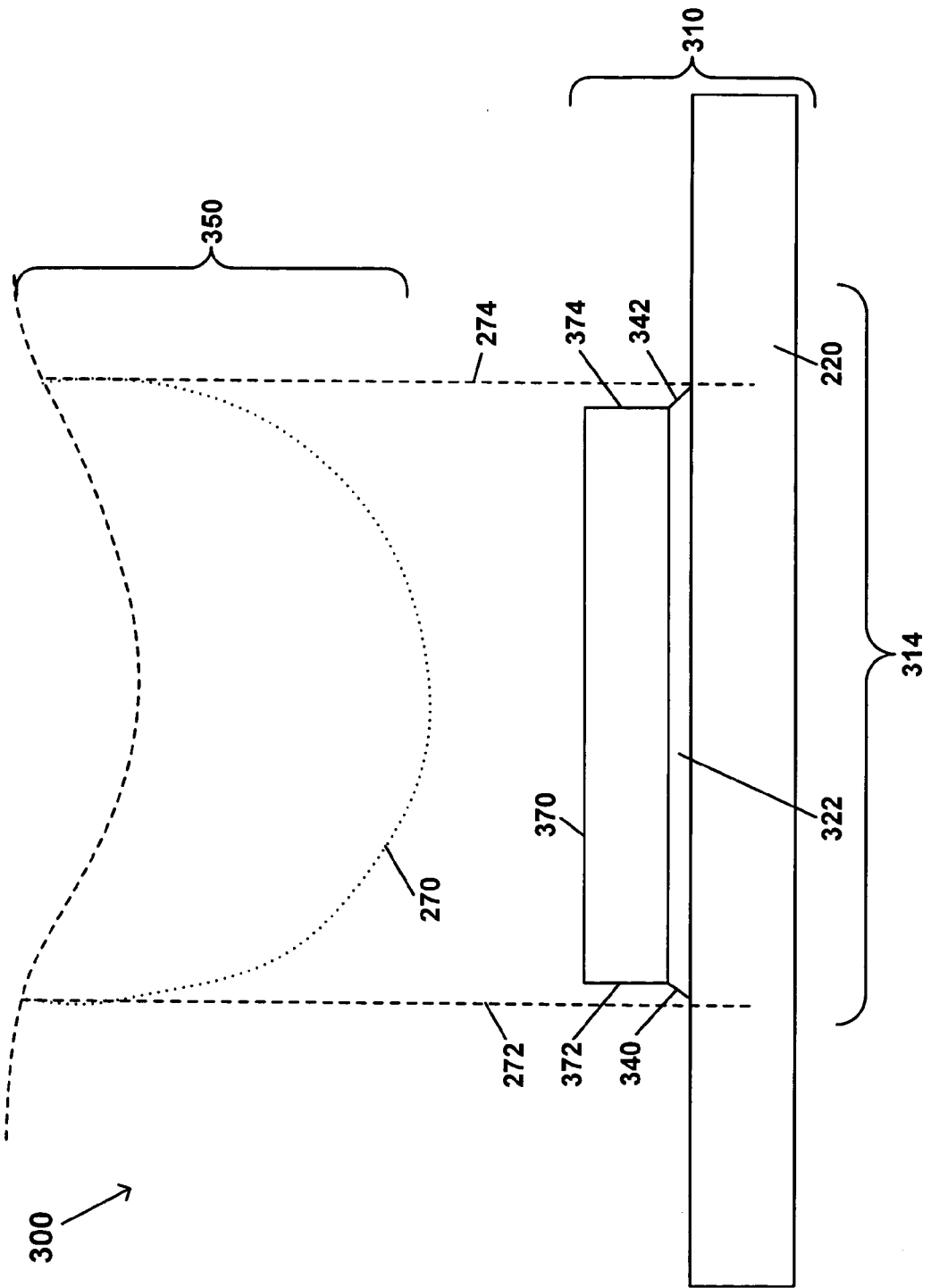
FIG. 3 is a combined cross-sectional and elevation view illustrating the build process upon completion of a sensor-stripe-height-definition process for the first test device in an embodiment of the present invention.

With reference to FIG. 3, in accordance with an embodiment of the present invention 300, the process of building the first test device 114 is described. A combined cross-sectional view 310 and elevation view 350 of a first partially built first test device 314 is shown in FIG. 3. The state of the build process is illustrated in FIG. 3 at the stage of completion of the sensor-stripe-height-definition process. The building of the first test device 114 comprises the deposition of the lower electrical contact layer 220 on a wafer substrate. The first electrical contact layer 220 is planarized, e.g. with a chemical mechanical polishing (CMP) process. A full film of sensor-layer-structure material is then deposited to fabricate the thin-film structure of the magnetic sensor. A layer of photoresist is then deposited, exposed and patterned to produce a mask for patterning the layer of sensor-layer-structure material in the photolithographic portion of the sensor-stripe-height-definition process. The photolithographic portion of the sensor-stripe-height-definition process produces a sensor-stripe-height, first-test-device mask 370. The wafer 120 is then patterned to remove material outside of the region protected by the sensor-stripe-height, first-test-device mask 370 to produce a partially patterned sensor-layer-structure 322 of the first test device 114 having the lateral dimensions in the plane of the wafer 120 defined by the sensor-stripe-height, first-test-device mask 370.

With further reference to FIG. 3, in accordance with an embodiment of the present invention 300, the circle 270 is shown by vertical lines 272 and 274 to correspond to a left edge 372 and a right edge 374 of the sensor-stripe-height, first-test-device mask 370. It should be recognized with reference to the elevation view 350 of FIG. 3 that the contours of the sensor-stripe-height, first-test-device mask 370 coincide approximately with the trace of the circle 270. After the removal of material outside of the region protected by the sensor-stripe-height, first-test-device mask 370, a left edge 340 and a right edge 342 are produced at the sides of the partially patterned sensor-layer-structure 322 of the first test device 114 by the material removal portion of the sensor-stripe-height-definition process, e.g. stripe-height ion milling. Thus, at this stage in the fabrication of the first test device 114, the resulting first partially built first test device 314 comprises the lower electrical contact layer 220, and the partially patterned sensor-layer-structure 322.

Figure 4:
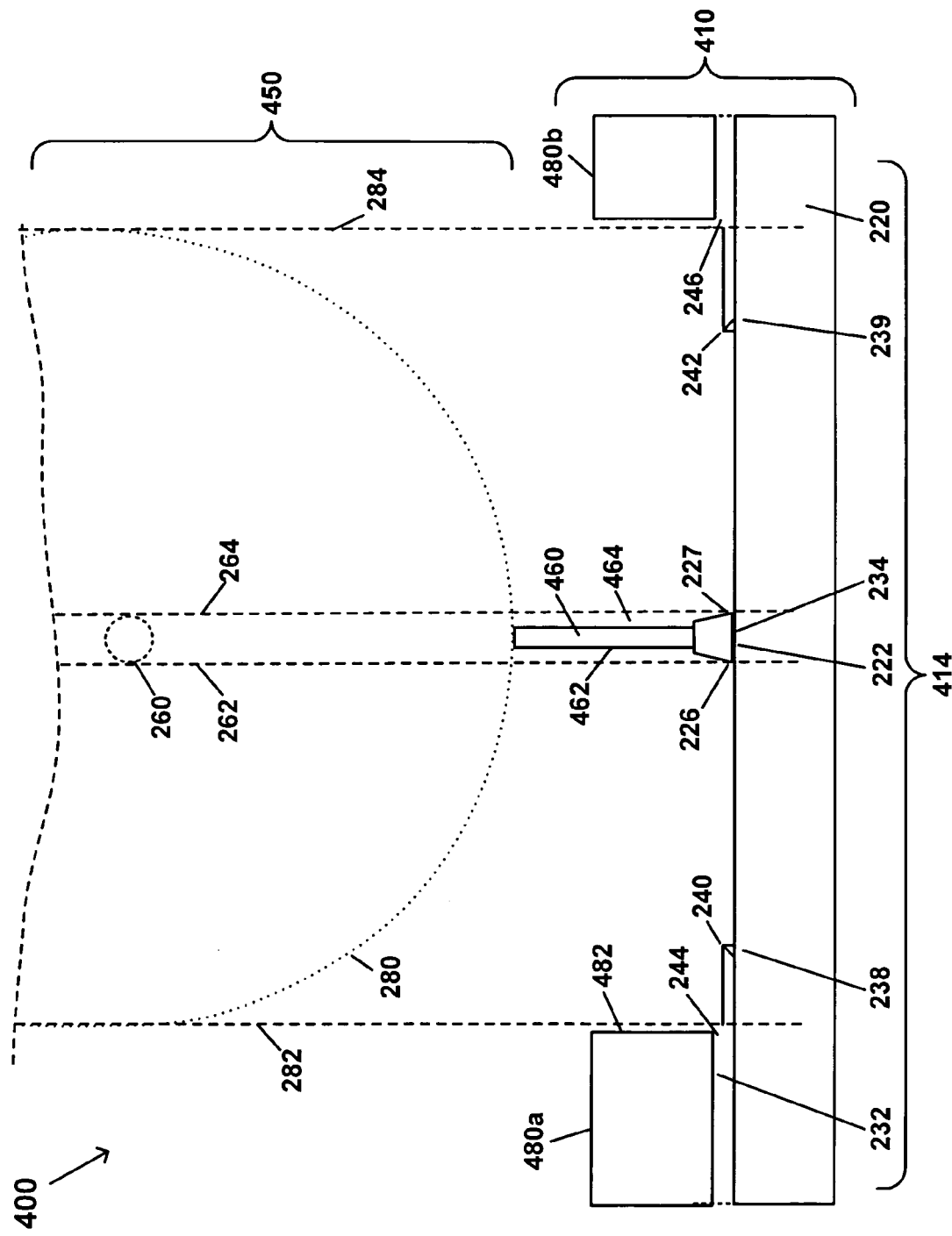
FIG. 4 is a combined cross-sectional and elevation view illustrating the build process upon completion of a sensor-width-definition process for the first test device in an embodiment of the present invention.

With reference now to FIG. 4, in accordance with an embodiment of the present invention 400, the process of building the first test device 114 is further described. A combined cross-sectional view 410 and elevation view 450 of a second partially built first test device 414 is shown in FIG. 4. The state of the build process is illustrated in FIG. 4 at the stage of completion of the sensor-width-definition process. The building of the first test device 114 further comprises the deposition of the field-region, electrical-isolation layer 232, which is planarized, e.g. with a CMP process. A second layer of photoresist is then deposited, exposed and patterned to produce a mask for patterning the partially patterned sensor-layer-structure 322 in the photolithographic portion of the sensor-width-definition process. The photolithographic portion of the sensor-width-definition process produces a sensor-width, first-test-device mask 460 and an outer sensor-width, first-test-device mask 480a-480b. As shown in FIG. 4, the outer sensor-width, first-test-device mask 480a-480b comprises a left portion 480a and a right portion 480b; these appear as separate isolated masks in cross-sectional view 410 of FIG. 4, but, in fact, are connected together in the plane of the wafer 120 to form in combination with the sensor-width, first-test-device mask 460 a annular aperture through which material may be removed. This is shown more clearly with reference to the elevation view 450 of FIG. 4, where the aperture produced by the two masks 460 and 480a-480b coincides approximately with the space between the circles 260 and 280.

With further reference to FIG. 4, in accordance with the embodiment of the present invention 400, the wafer 120 is then patterned. This patterning removes material outside of the region protected by the sensor-width, first-test-device mask 460 to produce the first sensor-layer-structure portion 222 of the first test device 114 having the lateral dimensions in the plane of the wafer 120 defined by the sensor-width, first-test-device mask 460. The central circle 260 is shown by vertical lines 262 and 264 to correspond to a left edge 462 and a right edge 464 of the sensor-width, first-test-device mask 460. After the removal of material outside of the region protected by the sensor-width, first-test-device mask 460, the left edge 226 and the right edge 227 are produced at the sides of the first sensor-layer-structure portion 222 of the first test device 114 by the material removal portion of the sensor-width-definition process. Thus, at this stage in the fabrication of the first test device 114, the resulting second partially built first test device 414 comprises the lower electrical contact layer 220 and the first sensor-layer-structure portion 222.

With further reference to FIG. 4, in accordance with the embodiment of the present invention 400, the circle 280 is shown by vertical lines 282 and 284 to correspond to a left edge 482 and a right edge 484 of the outer sensor-width, first-test-device mask 480a-480b. After the removal of material outside of the region protected by the outer sensor-width, first-test-device mask 480a-480b, the left edge 244 and the right edge 246 are produced at steps in the field-region, electrical-isolation layer 232 by the material removal portion of the sensor-width-definition process. Because the material removal rate may be different for the sensor-layer-structure material and the electrical-isolation layer material, the sensor-layer-structure material may be completely removed exposing a second set of edges, the left edge 240 and the right edge 242 of steps produced by the mask used in the sensor-stripe-height-definition process.

With further reference again to FIG. 4, in accordance with the embodiment of the present invention 400, the remainder of the process for building the first test device 114 is described. The electrical insulation layer 228 may be deposited as a blanket film over the entire wafer. Also, the magnetic-bias-layer structure 230 may be deposited as a blanket film over the entire wafer. Portions of these two layers are subsequently removed in a photolithographic lift-off process of masks 460 and 480a-480b. This is followed by a CMP process to planarize the surface of the wafer 120 in preparation for the deposition of the upper electrical contact layer 224. The upper electrical contact layer 224 may then be deposited to produce the final structure of the first test device 114 shown in FIG. 2.

Figure 5:
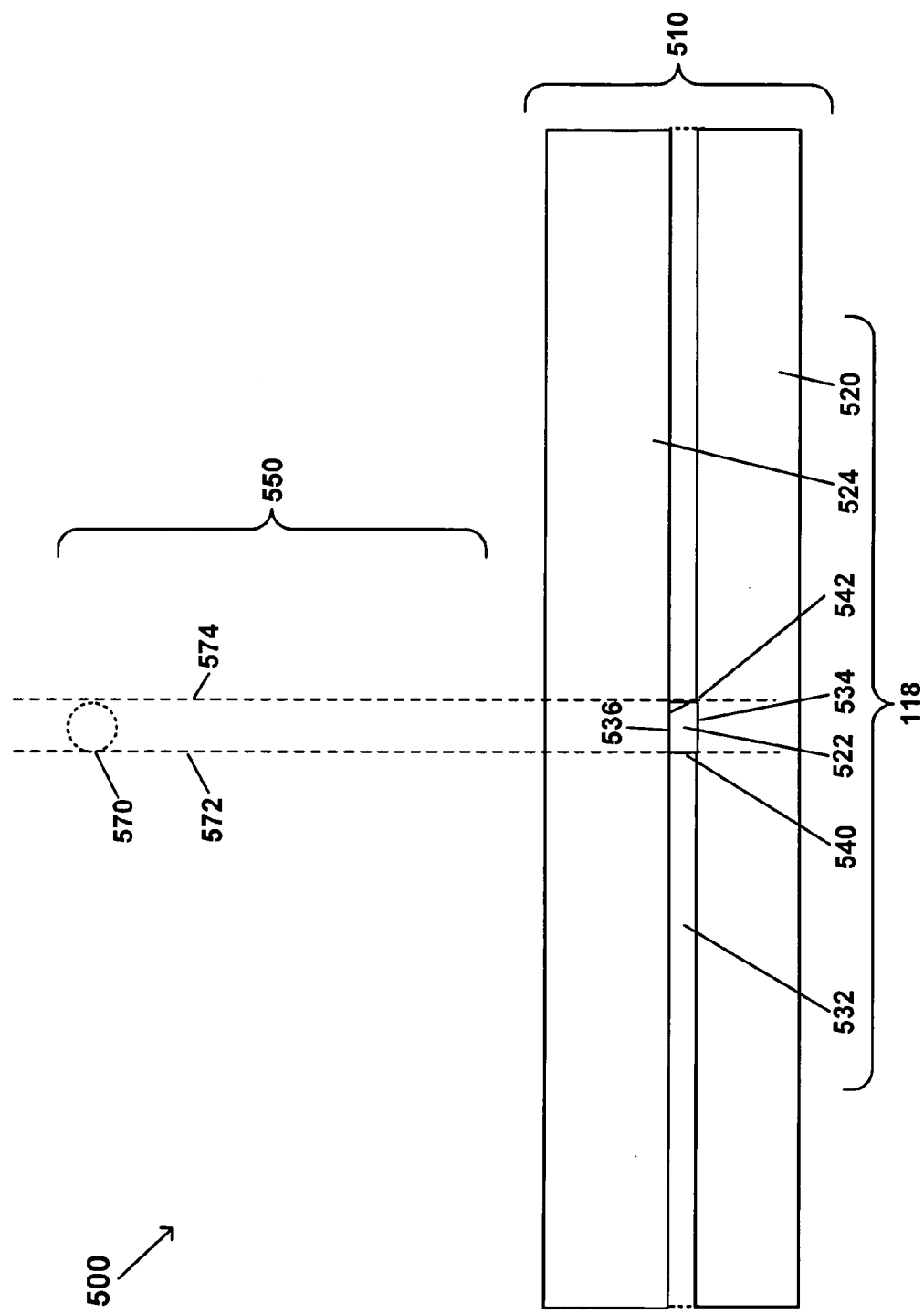
FIG. 5 is a combined cross-sectional and elevation view of a second test device for generating data to characterize a sensor-stripe-height-definition process in an embodiment of the present invention.

With reference to FIG. 5, in accordance with an embodiment of the present invention 500, the second test device 118 comprises a sensor-stripe-height-definition structure. A combined cross-sectional view 510 and elevation view 550 of the second test device 118 to characterize a sensor-stripe-height-definition process is shown. The sensor-stripe-height-definition structure of the second test device 118 comprises: a first electrical contact layer 520, e.g. a first shield layer (S1 layer); a second sensor-layer-structure portion 522, e.g. a TMR sensor-layer-structure; and a second electrical contact layer 524, e.g. a second shield layer (S2 layer); and a field-region, electrical-isolation layer 532, e.g. a refill alumina layer.

With further reference to FIG. 5, in accordance with the embodiment of the present invention 500, the second test device 118 further comprises the second sensor-layer-structure portion 522 with a left edge 540 and a right edge 542; the left edge 540 and the right edge 542 are defined in one-cut with the sensor-stripe-height-definition process. It should be appreciated that edges extend all around the second sensor-layer-structure portion 522 in the plane of the wafer 120 coinciding approximately with the trace of circle 570 shown in the elevation view 550 of FIG. 5. By fabricating all the edges of the second sensor-layer-structure portion 522 with one-cut, e.g. with only the sensor-stripe-height, ion-milling process, a second test device 118 is fabricated that is suitable for measurement of effects of the sensor-stripe-height-definition process deconvoluted from measurements of effects of a sensor-width-definition process in a manufacture of a magnetic sensor.

With reference to FIG. 5, in accordance with the embodiment of the present invention 500, the second test device 118 is configured so that a test current can flow in from the first electrical contact layer 520 across a bottom contact surface 534 of the second sensor-layer-structure portion 522 up through the second sensor-layer-structure portion 522 and out across a top contact surface 536 of the second sensor-layer-structure portion 522 into the second electrical contact layer 524.

With reference again to FIG. 5, in accordance with the embodiment of the present invention 500, the second test device 118 is shown in the elevation view 550 when looking down on the wafer 120 from above as for the view shown in FIG. 1. The device is shown as the circle 570; and, an active portion of the second test device 118 within the circle 570 comprises a second disk of sensor-layer-structure material, shown in the cross-sectional view 510 in the lower part of FIG. 5. The circle 570 is shown by vertical lines 572 and 574 to correspond to the left edge 540 and the right edge 542 of side walls of the second sensor-layer-structure portion 522 produced by the mask used in the sensor-stripe-height-definition process, e.g. the sensor-stripe-height-ion-milling mask; as shown, these edges 540 and 542 also coincide with the edges of the field-region, electrical-isolation layer 532. Because the second sensor-layer-structure portion 522 of the second test device 118 is defined in one-cut with the sensor-stripe-height-definition process, the second test device 118 allows independent characterization of sensor-width parameters without contributions from the effects associated with the sensor-width parameters.

Figure 6:
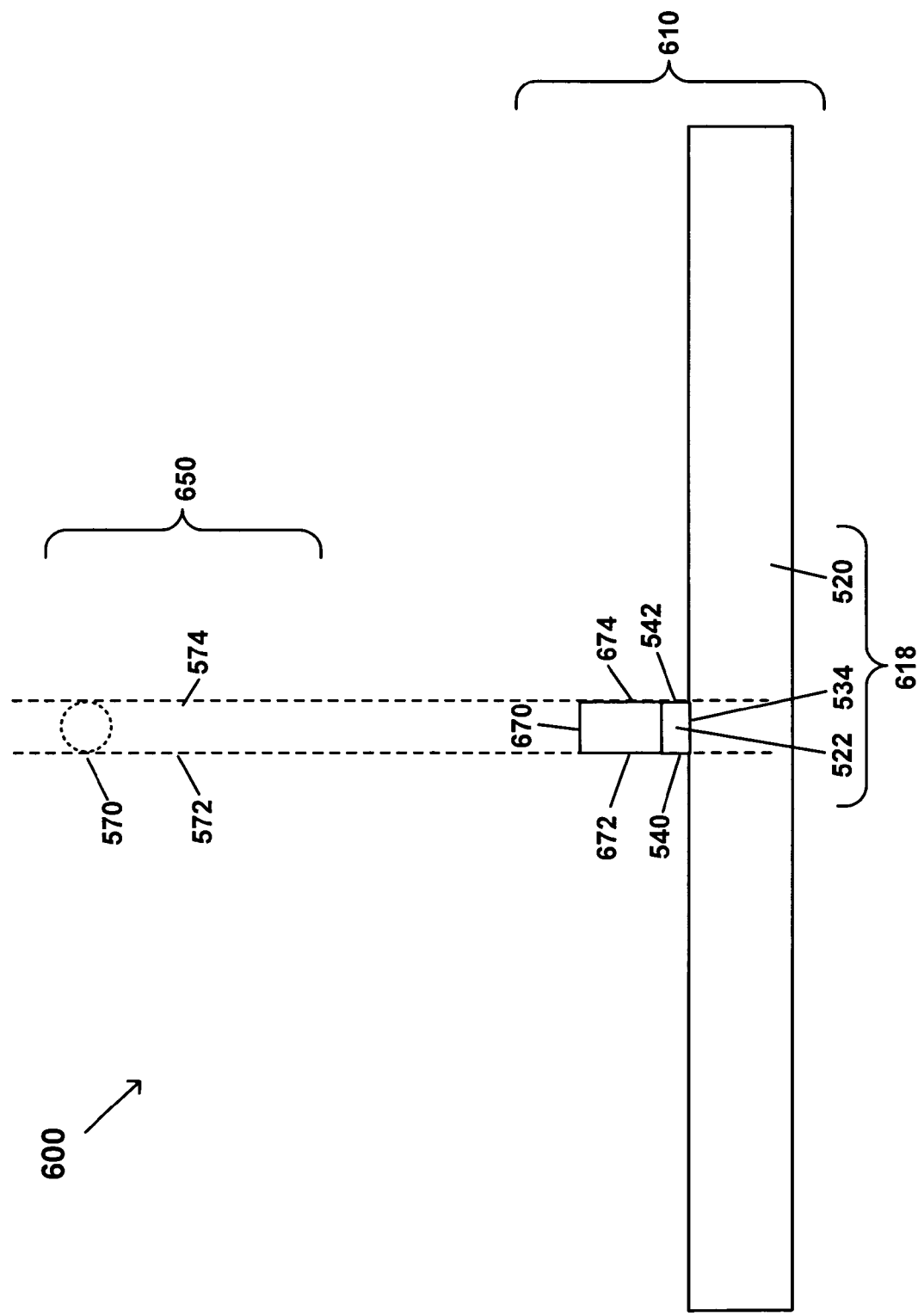
FIG. 6 is a combined cross-sectional and elevation view illustrating the build process upon completion of a sensor-stripe-height-definition process for the second test device in an embodiment of the present invention.

With reference now to FIG. 6, in accordance with an embodiment of the present invention 600, the process of building the second test device 118 is described. A combined cross-sectional view 610 and elevation view 650 of a partially built second test device 618 is shown in FIG. 6. The state of the build process is illustrated in FIG. 6 at the stage of completion of the sensor-stripe-height-definition process. The building of the second test device 118 comprises the deposition of the first electrical contact layer 520 on a wafer substrate. The first electrical contact layer 520 is planarized, e.g. with a chemical mechanical polishing (CMP) process. A full film of sensor-layer-structure material is then deposited. A layer of photoresist is then deposited, exposed and patterned to produce a mask for patterning the layer of sensor-layer-structure material in the photolithographic portion of the sensor-stripe-height-definition process. The photolithographic portion of the sensor-stripe-height-definition process produces a sensor-stripe-height, second-test-device mask 670. The wafer 120 is then patterned to remove material outside of the region protected by the sensor-stripe-height, second-test-device mask 670 to produce the second sensor-layer-structure portion 522 of the second test device 118 having the lateral dimensions in the plane of the wafer 120 defined by the sensor-stripe-height, second-test-device mask 670.

With further reference to FIG. 6, in accordance with the embodiment of the present invention 600, the circle 570 is shown by vertical lines 572 and 574 to correspond to a left edge 672 and a right edge 674 of the sensor-stripe-height, second-test-device mask 670. It should be recognized with reference to the elevation view 650 of FIG. 6 that the contours of the sensor-stripe-height, second-test-device mask 670 coincide approximately with the trace of the circle 570. After the removal of material outside of the region protected by the sensor-stripe-height, second-test-device mask 670, the left edge 540 and the right edge 542 are produced at the sides of the second sensor-layer-structure portion 522 of the second test device 118 by the material removal portion of the sensor-stripe-height-definition process. Thus, at this stage in the fabrication of the second test device 118, the resulting partially built second test device 618 comprises the first electrical contact layer 520, and the second sensor-layer-structure portion 522.

With further reference to FIG. 6, in accordance with the embodiment of the present invention 600, the process of building the second test device 118 is further described. The building of the second test device 118 further comprises the deposition of the field-region, electrical-isolation layer 532 shown in FIG. 5, e.g. a refill alumina layer, which is planarized, e.g. with a CMP process; the planarization process alone may be sufficient to remove the sensor-stripe-height, second-test-device mask 670. A second layer of photoresist is then deposited, but it is not exposed and patterned to produce a mask for patterning the second sensor-layer-structure portion 522, and only serves to protect the partially built second test device 618 during further wafer processing, although the second layer of photoresist may be exposed and patterned to produce masks elsewhere on the wafer, e.g. at the location of the first test device 114.

With reference once again to FIG. 6, in accordance with the embodiment of the present invention 600, the remainder of the process for building the second test device 118 is described. The electrical insulation layer 228 (not shown) may be deposited as a blanket film over the entire wafer. Also, the magnetic-bias-layer structure 230 (not shown) may be deposited as a blanket film over the entire wafer. Portions of these two layers are subsequently removed in a photolithographic lift-off process for masks formed in the second layer of photoresist. This is followed by a CMP process to planarize the surface of the wafer 120 in preparation for the deposition of the second electrical contact layer 524. The second electrical contact layer 524 may then be deposited to produce the final structure of the second test device 118 shown in FIG. 5.

Figure 7:
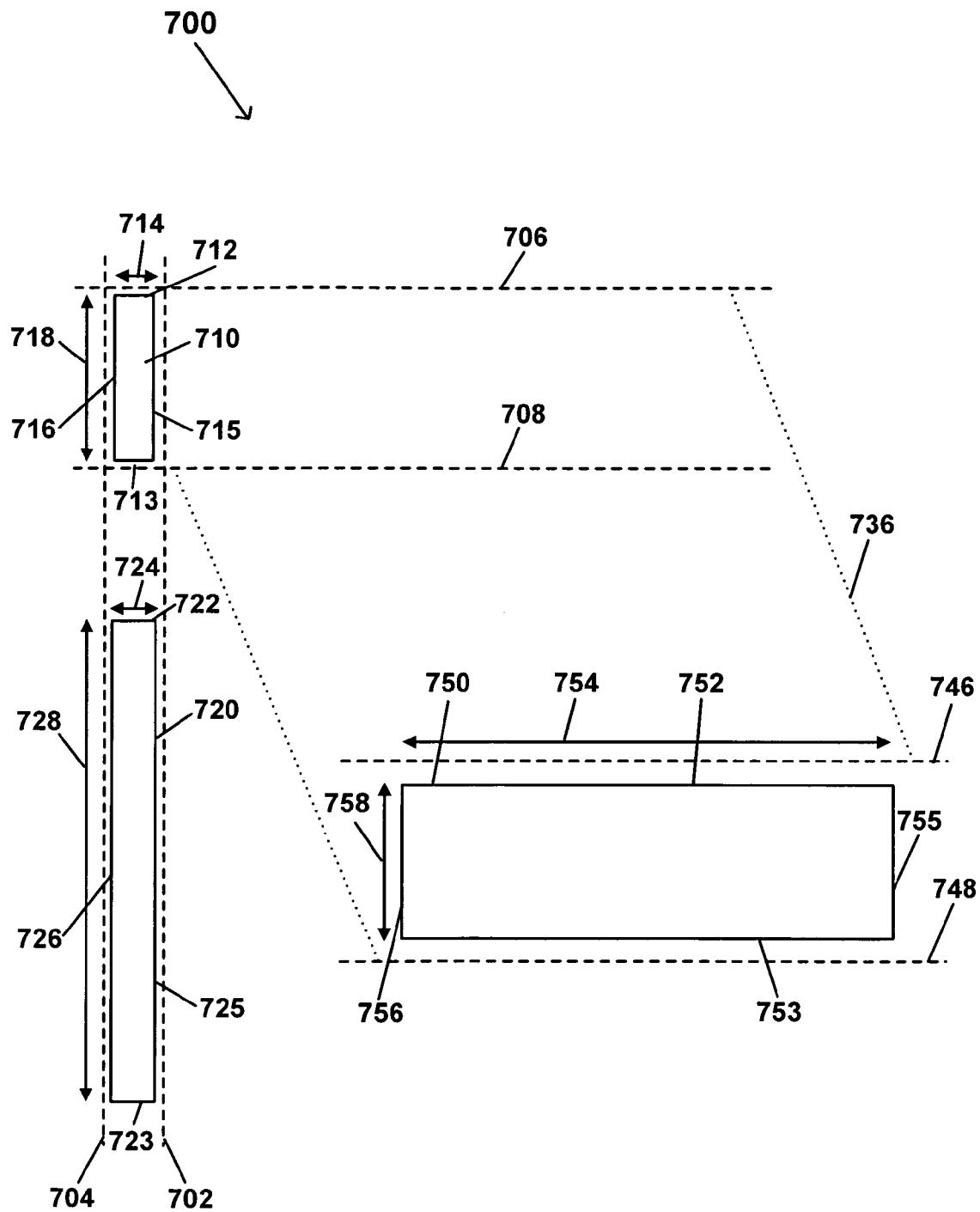
FIG. 7 are elevation views of alternative embodiments of the present invention that comprise test devices having a rectangular shape with edges aligned parallel to the edges of a magnetic sensor defined by a sensor-width-definition process, and a sensor-stripe-height-definition process, respectively.

With reference now to FIG. 7, in accordance with an embodiment of the present invention 700, elevation views of alternative embodiments of the present invention are shown that comprise test devices having a rectangular shape, a first rectangle 720 and a second rectangle 750. A magnetic sensor 710 is located in a portion of the wafer 120 that may later be diced into separate devices, and has sides 715 and 716 defined by the sensor-width-definition process and sides 712 and 713 defined by the sensor-stripe-height-definition process. It should be appreciated that two photoresist masks are used to define the magnetic sensor 710 in a two-cut process comprising both the sensor-width-definition process and the sensor-stripe-height-definition process; during the sensor-width-definition process, the sides 712 and 713 are protected by a sensor-width-definition mask; and during the sensor-stripe-height-definition process, the sides 715 and 716 are protected by a sensor-stripe-height-definition mask. The magnetic sensor 710 has a sensor width 714, and a sensor-stripe height 718. The aspect ratio of the magnetic sensor 710 is the ratio of the sensor-stripe height 718 to the sensor width 714; as shown, the aspect ratio of the magnetic sensor 710 is greater than unity, because at wafer level the sensor-stripe height 718 is significantly greater than the sensor width 714. The sides 715 and 716 lie parallel to lines 702 and 704, respectively; and, the sides 712 and 713 lie parallel to lines 706 and 708, respectively. The lines 706 and 708 lie parallel to lines 746 and 748 located on another portion of the wafer, e.g. a kerf portion. The correspondence between the lines 706 and 746 is indicated by line 736; and the correspondence between lines 708 and 748 is indicated by line 738.

In an embodiment of the present invention, the sensor-width-definition structure may comprise a first rectangle 720 of sensor-layer-structure material with edges; the first rectangle 720 may have a high aspect ratio with long sides 725 and 726 parallel to the sides 715 and 716 of the magnetic sensor 710 defined by the sensor-width-definition process, as shown by the lines 702 and 704. The first rectangle 720 may serve as the first test device 114 for characterizing the sensor-width-definition process. The long sides 725 and 726 of the first rectangle 720 serve to accumulate more redep to better characterize the effect of the redep on the shunting resistance affecting sensor-width parameters. The first rectangle 720 also has sides 722 and 723; but, instead of being defined with a second-cut by the sensor-stripe-height-definition process, the sides 722 and 723 are defined by the sensor-width-definition process with a single first-rectangle-width-definition mask. It should be appreciated that only a single photoresist mask is used to define first rectangle 720 in the one-cut process comprising the sensor-width-definition process; during the sensor-width-definition process, the sides 722 and 723 lie exposed and unprotected by the first-rectangle-width-definition mask. The first rectangle 720 has a first-rectangle width 724, and a first-rectangle length 728. The aspect ratio of the first rectangle 720 is the ratio of the first-rectangle length 728 to the first-rectangle width 724. In an embodiment of the present invention, the sensor-width-definition structure comprising first rectangle 720 may be located in a kerf portion of the wafer.

In another embodiment of the present invention, the sensor-stripe-height-definition structure may comprise a second rectangle 750 of sensor-layer-structure material with edges; the second rectangle 750 may have a high aspect ratio with long sides 752 and 753 parallel to the sides 712 and 713 of the magnetic sensor 710 defined by the sensor-stripe-height-definition process, as shown by the lines 706 and 708, and lines 746 and 748. The second rectangle 750 may serve as the second test device 118 for characterizing the sensor-stripe-height-definition process. The long sides 752 and 753 of the second rectangle 750 may serve to accumulate more redep to better characterize the effect of the redep on the shunting resistance affecting sensor-stripe-height parameters. The second rectangle 750 also has sides 755 and 756; but, instead of being defined by the sensor-width-definition process, the sides 755 and 756 are defined in one-cut by the sensor-stripe-height-definition process. It should be appreciated that only a single photoresist mask is used to define the second rectangle 750 in the one-cut process comprising the sensor-stripe-height-definition process; during the sensor-stripe-height-definition process, the sides 755 and 756 lie exposed and unprotected by the second-rectangle-stripe-height-definition mask. The second rectangle 750 has a second-rectangle width 758, and a second-rectangle length 754. The aspect ratio of the second rectangle 750 is the ratio of second-rectangle length 754 to the second-rectangle width 758. In an embodiment of the present invention, the sensor-stripe-height-definition structure comprising second rectangle 750 may be located in a kerf portion of the wafer.

In another embodiment of the present invention, the test-device system 110 for deconvoluting measurements of effects of a sensor-width definition process from measurements of effects of a sensor-stripe-height-definition process in a manufacture of a magnetic sensor may comprise a first test-device-system portion. The first test-device-system portion may comprise the first test device 114, or alternatively the second test device 118. The first test-device-system portion may be configured to measure a parameter corresponding to the first sensor-structure-definition process. If the first test-device-system portion comprises the first test device 114, then the first sensor-structure-definition process may comprise the sensor-width-definition process; or alternatively, if the first test-device-system portion comprises the second test device 118, then the first sensor-structure-definition process may comprise the sensor-stripe-height-definition process. The test-device system 110 allows independent characterization of a first sensor-structure-definition-process parameter and a second sensor-structure-definition-process parameter.

The test-device system 110 may further comprise a second test-device-system portion. If the first test-device-system portion comprises the first test device 114, then the second test-device-system portion may comprise the second test device 118; or alternatively, if the first test-device-system portion comprises the second test device 118, then the second test-device-system portion may comprise the first test device 114. The second test-device-system portion may be configured to measure a parameter corresponding to the second sensor-structure-definition process. If the second test-device-system portion comprises the first test device 114, then the second sensor-structure-definition process may comprise the sensor-width-definition process; or alternatively, if the second test-device-system portion comprises the second test device 118, then the second sensor-structure-definition process may comprise sensor-stripe-height-definition process. The test-device system 110 allows independent characterization of the first sensor-structure-definition-process parameter and the second sensor-structure-definition-process parameter, because the first test-device-system portion and the second test-device-system portion comprises a pair of dedicated test devices, the first test device 114, and the second test device 118, such that each test device is dedicated separately to the measurement of the effects of the sensor-width-definition process and the sensor-stripe-height-definition process, respectively.

In another embodiment of the present invention, it should be recognized that the first sensor-structure-definition process may comprise the sensor-width-definition process and the second sensor-structure-definition process may comprise the sensor-stripe-height-definition process. The first test-device-system portion may comprise a first disk of sensor-layer-structure material defined by the sensor-width-definition process, and the second test-device-system portion may comprise a second disk of sensor-layer-structure material defined by the sensor-stripe-height-definition process. The first test-device-system portion may further comprise the first sensor-layer-structure portion 222 with edges defined by one-cut with the sensor-width-definition process, and the second test-device-system portion comprises the second sensor-layer-structure portion 522 with edges defined by one-cut with the sensor-stripe-height-definition process.

In an alternative embodiment of the present invention, it should be recognized that the first sensor-structure-definition process may comprise the sensor-stripe-height-definition process and the second sensor-structure-definition process may comprise the sensor-width definition process. The second test-device-system portion may comprise a first disk of sensor-layer-structure material defined by the sensor-width-definition process, and the first test-device-system portion may comprise a second disk of sensor-layer-structure material defined by the sensor-stripe-height-definition process. The second test-device-system portion may comprise the first sensor-layer-structure portion 222 with edges defined by one-cut with the sensor-width-definition process, and the first test-device-system portion comprises the second sensor-layer-structure portion 522 with edges defined by one-cut with the sensor-stripe-height-definition process.

Figure 8:
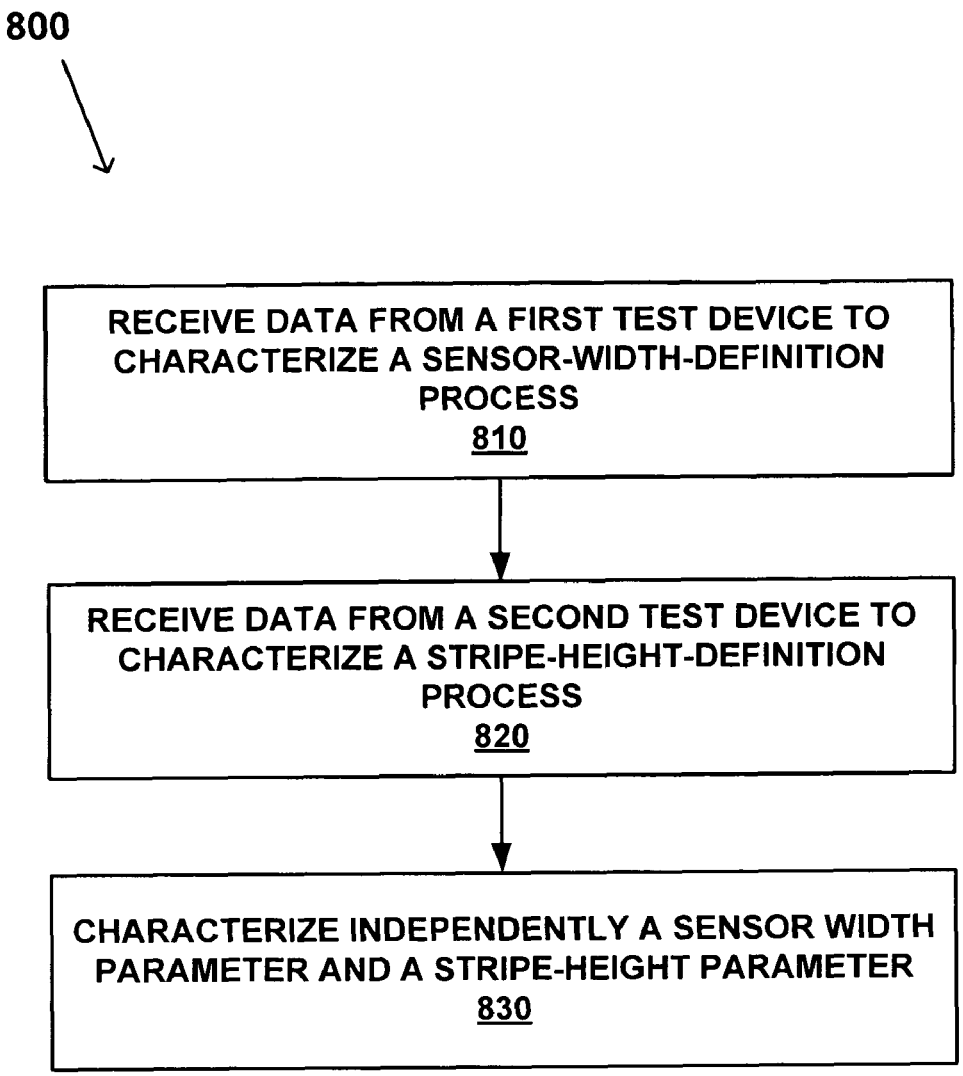
FIG. 8 is a flow chart illustrating a method for deconvoluting measurements corresponding to effects of a sensor-width definition process from measurements corresponding to effects of a sensor-stripe-height-definition process in an embodiment of the present invention.

Description of Embodiments of the Present Invention for a Method for Independent Characterization of Sensor-Width and Sensor-Stripe-Height Definition Processes With reference to FIG. 8, in accordance with an embodiment of the present invention 800, a method for deconvoluting measurements corresponding to effects of a sensor-width definition process from measurements corresponding to effects of a sensor-stripe-height-definition process in a manufacture of a magnetic sensor is shown. The method receives data by 810 from the first test device 114 to characterize a sensor-width-definition process, and receives data by 820 from the second test device 118 to characterize a sensor-stripe-height-definition process. The method characterizes independently by 830 a sensor-width parameter and a sensor-stripe-height parameter.

With further reference to FIG. 8, in accordance with the embodiment of the present invention 800, the method determines parameters characterizing the sensor-width-definition process from the data received by 810 from the first test device 114. Embodiments of the present invention facilitate the determination of a parameter, the shunting resistance associated with redep from just the sensor-width-definition process.

With further reference to FIG. 8, in accordance with the embodiment of the present invention 800, the method determines parameters characterizing the sensor-stripe-height-definition process from the data received by 810 from the second test device 118. Embodiments of the present invention facilitate the determination of a parameter, the shunting resistance associated with redep from just the sensor-stripe-height-definition process.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments described herein were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A test-device system for deconvoluting measurements of effects of a sensor-width definition process from measurements of effects of a sensor-stripe-height-definition process in a manufacture of a magnetic sensor, comprising:
   a first test device for generating data to characterize a sensor-width-definition process;
   a second test device for generating data to characterize a sensor-stripe-height-definition process;
   wherein said test-device system allows independent characterization of a sensor-width parameter and a sensor-stripe-height parameter.

2. The test-device-system of claim 1, wherein said first test device further comprises a sensor-width-definition structure.

3. The test-device-system of claim 2, wherein said first test device further comprises a first sensor-layer-structure portion with edges, said edges defined in one-cut with said sensor-width-definition process.

4. The test-device-system of claim 2, wherein said sensor-width-definition structure further comprises a first disk of sensor-layer-structure material.

5. The test-device-system of claim 2, wherein said sensor-width-definition structure further comprises a first rectangle of sensor-layer-structure material with edges, said first rectangle with a high aspect ratio with the long sides parallel to the sides of the magnetic sensor defined by the sensor-width-definition process.

6. The test-device-system of claim 1, wherein said second test device further comprises a sensor-stripe-height-definition structure.

7. The test-device-system of claim 6, wherein said second test device further comprises a second sensor-layer-structure portion with edges, said edges defined in one-cut with said sensor-stripe-height-definition process.

8. The test-device-system of claim 6, wherein said second sensor-stripe-height-definition structure further comprises a second disk of sensor-layer-structure material.

9. The test-device-system of claim 6, wherein said sensor-width-definition structure further comprises a second rectangle of sensor-layer-structure material with edges, said second rectangle with a high aspect ratio with the long sides parallel to the sides of the magnetic sensor defined by the sensor-stripe-height-definition process.

10. A test-device system for deconvoluting measurements of effects of a sensor-width definition process from measurements of effects of a sensor-stripe-height-definition process in a manufacture of a magnetic sensor, comprising:
a first test-device-system portion, said first test-device-system portion configured to measure a parameter corresponding to a first sensor-structure-definition process;
wherein said test-device system allows independent characterization of said first sensor-structure-definition-process parameter and a second sensor-structure-definition-process parameter.

11. The test-device system of claim 10, further comprising a second test-device-system portion, said second test-device-system portion configured to measure a parameter corresponding to a second sensor-structure-definition process.

12. The test-device system of claim 11, wherein said first sensor-structure-definition process is a sensor-width-definition process and said second sensor-structure-definition process is a sensor-stripe-height-definition process.

13. The test-device system of claim 12, wherein said first test-device-system portion comprises a first disk of sensor-layer-structure material defined by said sensor-width-definition process, and said second test-device-system portion comprises a second disk of sensor-layer-structure material defined by said sensor-stripe-height-definition process.

14. The test-device system of claim 12, wherein said first test-device-system portion further comprises a first sensor-layer-structure portion with edges, said edges defined by one-cut with said sensor-width-definition process, and second test-device-system portion comprises a second sensor-layer-structure portion with edges, said edges defined by one-cut with said sensor-stripe-height-definition process.

15. The test-device system of claim 11, wherein said first sensor-structure-definition process is a sensor-stripe-height-definition process and said second sensor-structure-definition process is a sensor-width definition process.

16. The test-device system of claim 15, wherein said second test-device-system portion further comprises a first disk of sensor-layer-structure material defined by said sensor-width-definition process, and said first test-device-system portion further comprises a second disk of sensor-layer-structure material defined by said sensor-stripe-height-definition process.

17. The test-device system of claim 15, wherein said second test-device-system portion further comprises a first sensor-layer-structure portion with edges, said edges defined by one-cut with said sensor-width-definition process, and said first test-device-system portion comprises a second sensor-layer-structure portion with edges, said edges defined by one-cut with said sensor-stripe-height-definition process.

18. A method for deconvoluting measurements corresponding to effects of a sensor-width definition process from measurements corresponding to effects of a sensor-stripe-height-definition process in a manufacture of a magnetic sensor, comprising:
receiving data from a first test device to characterize a sensor-width-definition process;
receiving data from a second test device to characterize a sensor-stripe-height-definition process;
wherein said method allows independent characterization of a sensor-width parameter and a sensor-stripe-height parameter.

19. The method as recited in claim 18, further comprising:
determining a parameter characterizing said sensor-width-definition process from said data received from said first test device.

20. The method as recited in claim 18, further comprising:
determining a parameter characterizing said sensor-stripe-height-definition process from said data received from said second test device.

* * * * *